United States Patent [19]
Mattingly

[11] Patent Number: 6,095,600
[45] Date of Patent: Aug. 1, 2000

[54] BICYCLE SEAT

[76] Inventor: Francis J. Mattingly, 1510 Glenrock Rd., Louisville, Ky. 40216

[21] Appl. No.: 09/321,259

[22] Filed: May 27, 1999

[51] Int. Cl.⁷ .................................. B62J 1/00; B62J 1/18
[52] U.S. Cl. ........................................ 297/201; 297/452.4
[58] Field of Search ............................. 297/201, 215.13, 297/202, 452.4, 195.1

[56] References Cited

U.S. PATENT DOCUMENTS

| | | | |
|---|---|---|---|
| 563,063 | 6/1896 | Pullman | 297/201 |
| 604,068 | 5/1898 | Morgan | 297/201 |
| 694,875 | 3/1902 | Meighan | 297/201 |
| 3,874,730 | 4/1975 | Marchello . | |
| 4,572,575 | 2/1986 | Golden et al. . | |
| 4,877,286 | 10/1989 | Hobson et al. | 297/195.1 |
| 5,165,752 | 11/1992 | Terry . | |
| 5,333,930 | 8/1994 | Glenn . | |
| 5,597,202 | 1/1997 | Andersen . | |
| 5,645,315 | 7/1997 | Walker et al. . | |
| 5,681,084 | 10/1997 | Yoneda | 297/452.4 X |
| 5,713,632 | 2/1998 | Su | 297/452.4 X |
| 5,775,642 | 7/1998 | Beroth | 297/248 X |
| 5,863,094 | 1/1999 | Endo | 297/201 |
| 5,873,626 | 2/1999 | Katz | 297/202 |

FOREIGN PATENT DOCUMENTS

| | | | |
|---|---|---|---|
| 360232 | of 0000 | France | 297/201 |
| 930110245 | 6/1993 | WIPO | 297/201 |

*Primary Examiner*—Peter R. Brown
*Assistant Examiner*—David E. Allred
*Attorney, Agent, or Firm*—Joseph N. Breaux

[57] ABSTRACT

A bicycle seat including a multi-section seat cushion assembly including a left, right and center seat cushion each having the top surfaces connected to another seat cushion section with a resilient seat cover portion. The seat cushion sections are supported on separate seat cushion support plates that are adjustably positionable between an expanded position and a retracted position with a screw support assembly adjustment mechanism.

1 Claim, 2 Drawing Sheets

BICYCLE SEAT

TECHNICAL FIELD

The present invention relates to bicycle seats and more particularly to a bicycle seat that includes a tubular seat support post; a three section U-shaped seat expandable support plate assembly including a center support plate, a left support plate and a right support plate, the left support plate and right support plate each being connected to the center support plate by a user length adjustable support assembly such that the left and right support plates are simultaneously positionable away from and toward the center support plate by operation of a screw support assembly adjustment mechanism, the tubular seat support post being rigidly attached to the screw support assembly adjustment mechanism; and a contoured three section U-shaped, expandable seat cushion assembly provided with a groin positioning gap defined between the center, left and right seat cushion sections of the seat cushion assembly for preventing pressure from being exerted against the groin area of a bicycle rider; the top surface of the right seat cushion section being connected to the top surface of the center seat cushion section with a first resiliently expandable seat cover section; the top surface of the left seat cushion section being connected to the top surface of the center seat cushion section with a second expandable seat cover section.

BACKGROUND ART

Bicycle riders can find conventional bicycle seats uncomfortable because the seat exerts an uncomfortable amount of pressure to the user's groin area. It would be desirable, therefore, to have a bicycle seat that minimized undesirable pressure on the groin area of the user. In addition because a number of riders may use the bicycle seat, it would be further desirable to have a multi-section bicycle seat that included a width adjustment mechanism that allowed the width of the multi-section bicycle seat to be adjusted without creating top surface gaps between the seat sections.

GENERAL SUMMARY DISCUSSION OF INVENTION

It is thus an object of the invention to provide a bicycle seat that includes a tubular seat support post; a three section U-shaped seat expandable support plate assembly including a center support plate, a left support plate and a right support plate, the left support plate and right support plate each being connected to the center support plate by a user length adjustable support assembly such that the left and right support plates are simultaneously positionable away from and toward the center support plate by operation of a screw support assembly adjustment mechanism, the tubular seat support post being rigidly attached to the screw support assembly adjustment mechanism; and a contoured three section U-shaped, expandable seat cushion assembly provided with a groin positioning gap defined between the center, left and right seat cushion sections of the seat cushion assembly for preventing pressure from being exerted against the groin area of a bicycle rider; a top surface of the right seat cushion section being connected to the top surface of the center seat cushion section with a first resiliently expandable seat cover section; a top surface of the left seat cushion section being connected to the top surface of the center seat cushion section with a second expandable seat cover section.

Accordingly, a bicycle seat is provided. The bicycle seat includes a tubular seat support post; a three section U-shaped seat expandable support plate assembly including a center support plate, a left support plate and a right support plate, the left support plate and right support plate each being connected to the center support plate by a user length adjustable support assembly such that the left and right support plates are simultaneously positionable away from and toward the center support plate by operation of a screw support assembly adjustment mechanism, the tubular seat support post being rigidly attached to the screw support assembly adjustment mechanism; and a contoured three section U-shaped, expandable seat cushion assembly provided with a groin positioning gap defined between the center, left and right seat cushion sections of the seat cushion assembly for preventing pressure from being exerted against the groin area of a bicycle rider; a top surface of the right seat cushion section being connected to the top surface of the center seat cushion section with a first resiliently expandable seat cover section; a top surface of the left seat cushion section being connected to the top surface of the center seat cushion section with a second expandable seat cover section.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
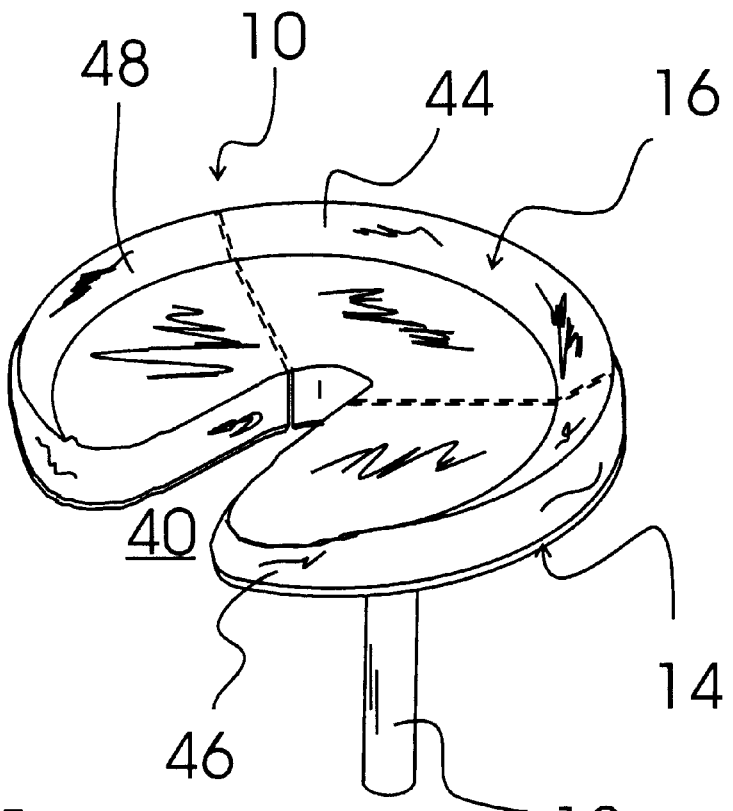
FIG. 1 is a perspective view of an exemplary embodiment of the bicycle seat of the present inventions showing the tubular seat support post; the three section U-shaped seat expandable support plate assembly including a center support plate, a left support plate and a right support plate, the left support plate and right support plate each being connected to the center support plate by a user length adjustable support assembly such that the left and right support plates are simultaneously positionable away from and toward the center support plate by operation of a screw support assembly adjustment mechanism; and the contoured three section U-shaped, expandable seat cushion assembly provided with a groin positioning gap defined between the center, left and right seat cushion sections of the seat cushion assembly for preventing pressure from being exerted against the groin area of a bicycle rider; the top surface of the right seat cushion section being connected to the top surface of the center seat cushion section with a first resiliently expandable seat cover section; the top surface of the left seat cushion section being connected to the top surface of the center seat cushion section with a second expandable seat cover section.

FIGS. 1–4 show an exemplary embodiment of the bicycle seat of the present invention generally designated 10. Bicycle seat 10 includes a tubular seat support post 12; a three section U-shaped seat expandable support plate assembly, generally designated 14; and a contoured three section U-shaped, expandable seat cushion assembly, generally designated 16. Tubular seat support post 12 is sized to connect with the frame of a bicycle.

Figure 3:
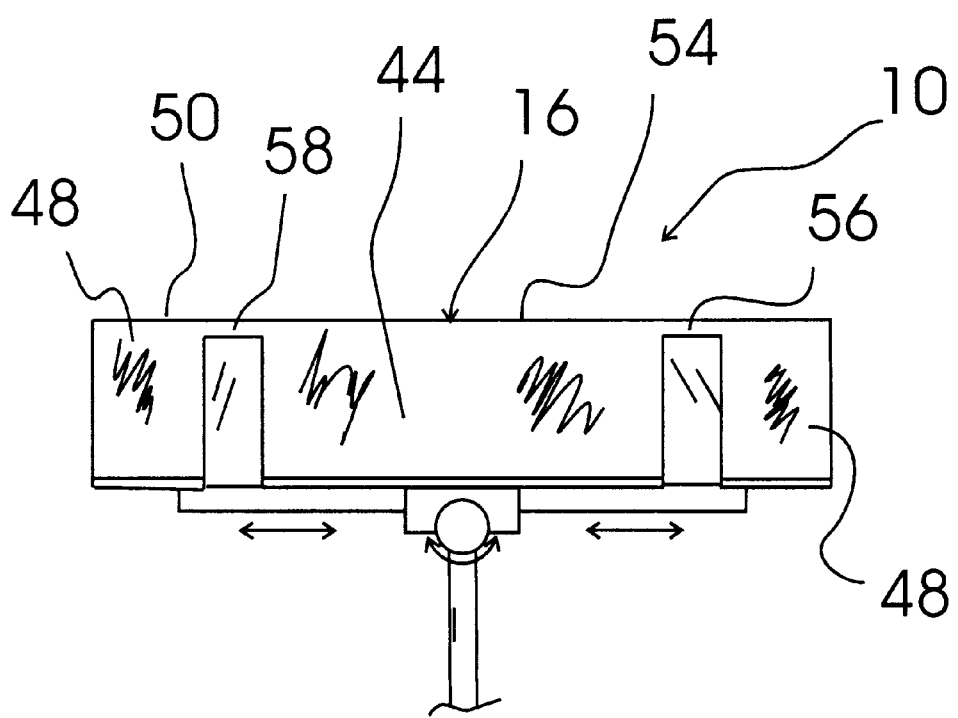
FIG. 3 is a second underside plan view of the of the bicycle seat of FIG. 1 showing the center, left and right support plates connected to the center support plate by the user length adjustable support assembly and positioned in the fully expanded position with the center left and right seat cushion sections connected by the expanded first and second expandable seat cover sections.
Figure 2:
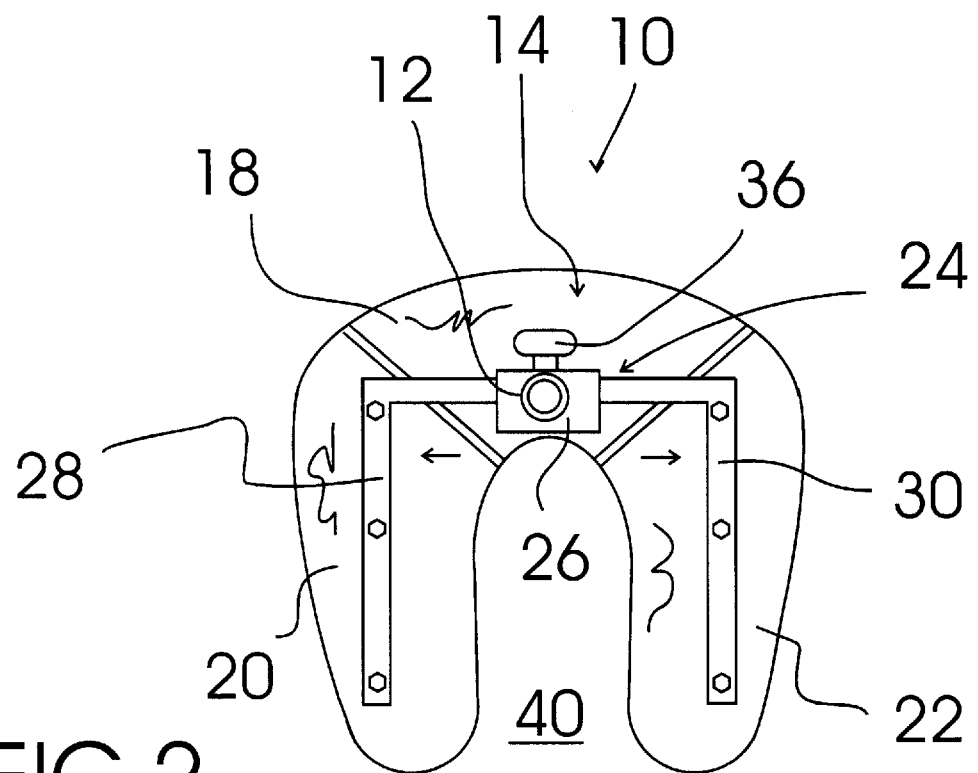
FIG. 2 is an underside plan view of the of the bicycle seat of FIG. 1 showing the tubular seat support post; the center, left and right support plates connected to the center support plate by the user length adjustable support assembly and positioned in the fully retracted position and the screw support assembly adjustment mechanism.
Figure 4:
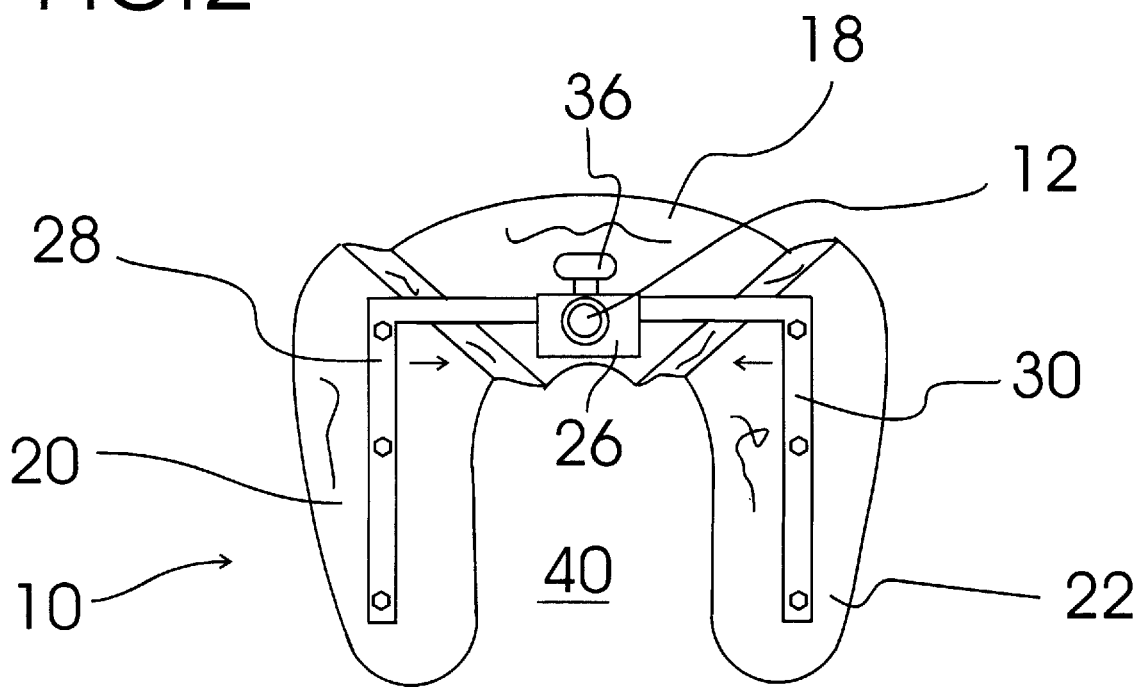
FIG. 4 is a back side plan view of the of the bicycle seat of FIG. 1 showing the back side of the center left and right seat cushions in the fully expanded configuration with the center, left and right support plates connected to the center support plate by the user length adjustable support assembly and the center, left and right seat cushion sections connected by the expanded first and second expandable seat cover sections.

With reference to FIGS. 2 and 3, three section U-shaped seat expandable support plate assembly 14 includes a steel center support plate 18, a steel left support plate 20 and a steel right support plate 22. Left support plate 20 and right support plate 22 are each connected to center support plate 18 by a user length adjustable support assembly, generally designated 24. Length adjustable support assembly 24 includes a screw support assembly adjustment mechanism 26 attached to center support plate 18 that operates an L-shaped left plate support rod 28 and an L-shaped right plate support rod 30 such that left and right support plates 20,22 are simultaneously positionable away from and toward center support plate 18 between a retracted position (FIG. 2) and an expanded position (FIG. 3) by rotating knob 36 of screw support assembly adjustment mechanism 26. Tubular seat support 12 is rigidly attached to screw support assembly adjustment mechanism 26, Referring back to FIG. 1, contoured three section U-shaped, expandable seat cushion assembly 16 provides with a groin positioning gap 40 defined between a center, a left and a right seat cushion section 44,46,48, respectively, for preventing pressure from being exerted against the groin area of a bicycle rider. Referring to FIG. 4, a top surface 52 of right seat cushion section 48 is connected to top surface 54 of center seat cushion section 44 with a first resiliently expandable seat cover section 56. A top surface 50 of left seat cushion section 28 is connected to top surface 54 of center seat cushion section 44 with a second expandable seat cover section 58. First and second expandable seat cover sections 56,58 bridge the gap between the seat cushion section 44,46,48 and prevent pinching of the rider's buttocks when seat cushion sections 44,46,48 are in the expanded position.

It can be seen from the preceding description that a bicycle seat has been provided that includes a tubular seat support post; a three section U-shaped seat expandable support plate assembly including a center support plate, a left support plate and a right support plate, the left support plate and right support plate each being connected to the center support plate by a user length adjustable support assembly such that the left and right support plates are simultaneously positionable away from and toward the center support plate by operation of a screw support assembly adjustment mechanism, the tubular seat support post being rigidly attached to the screw support assembly adjustment mechanism; and a contoured three section U-shaped, expandable seat cushion assembly provided with a groin positioning gap defined between the center, left and right seat cushion sections of the seat cushion assembly for preventing pressure from being exerted against the groin area of a bicycle rider; a top surface of the right seat cushion section being connected to the top surface of the center seat cushion section with a first resiliently expandable seat cover section; a top surface of the left seat cushion section being connected to the top surface of the center seat cushion section with a second expandable seat cover section.

It is noted that the embodiment of the bicycle seat described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A bicycle seat comprising:

a tubular seat support post;

a three section U-shaped seat expandable support plate assembly including a center support plate, a left support plate and a right support plate, said left support plate and right support plate each being connected to said center support plate by a user length adjustable support assembly such that said left and right support plates are simultaneously positionable away from and toward said center support plate by operation of a screw support assembly adjustment mechanism, said tubular seat support post being rigidly attached to said screw support assembly adjustment mechanism; and a contoured three section U-shaped, expandable seat cushion assembly including a center cushion section supported on said center support plate, a left cushion section supported on said left support plate, and a right cushion section supported on said right support plate, said cushion assembly provided with a groin positioning gap defined between said center, left and right seat cushion sections of said seat cushion assembly for preventing pressure from being exerted against said groin area of a bicycle rider;

a top surface of said right seat cushion section being connected to said top surface of said center seat cushion section with a first resiliently expandable seat cover section;

a top surface of said left seat cushion section being connected to said top surface of said center seat cushion section with a second expandable seat cover section.

* * * * *